United States Patent
Kim et al.

(10) Patent No.: US 8,862,147 B2
(45) Date of Patent: Oct. 14, 2014

(54) METHOD FOR MANAGING NEIGHBOR BASE STATION LIST BASED ON TERMINAL LOCATION FOR EFFICIENT CELL SELECTION AND HANDOFF IN MACROCELL ENVIRONMENTS WITH FEMTOCELL

(75) Inventors: Won-Ik Kim, Daejeon (KR); Ho-Shin Cho, Daejeon (KR); Sung-Geun Jin, Daejeon (KR); Hyun Lee, Daejeon (KR); Chul Sik Yoon, Seoul (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 588 days.

(21) Appl. No.: 13/132,894

(22) PCT Filed: Nov. 24, 2009

(86) PCT No.: PCT/KR2009/006916
§ 371 (c)(1),
(2), (4) Date: Jun. 3, 2011

(87) PCT Pub. No.: WO2010/064803
PCT Pub. Date: Jun. 10, 2010

(65) Prior Publication Data
US 2011/0237252 A1    Sep. 29, 2011

(30) Foreign Application Priority Data

Dec. 5, 2008 (KR) .................. 10-2008-0123304
Aug. 26, 2009 (KR) .................. 10-2009-0079442

(51) Int. Cl.
H04W 24/00    (2009.01)
H04W 36/00    (2009.01)
(Continued)

(52) U.S. Cl.
CPC ........ *H04W 36/0083* (2013.01); *H04W 84/045* (2013.01); *H04Q 48/08* (2013.01); *H04W 64/00*
(Continued)

(58) Field of Classification Search
USPC ................................................ 455/444, 456.1
See application file for complete search history.

(56) References Cited

U.S. PATENT DOCUMENTS

| 5,579,374 | A | 11/1996 | Doi et al. |
| 7,761,099 | B2 | 7/2010 | Kim et al. |
| 8,238,921 | B2 * | 8/2012 | Chang et al. .................. 455/444 |

FOREIGN PATENT DOCUMENTS

| EP | 0986279 A1 | 3/2000 |
| JP | 7075154 A | 3/1995 |

(Continued)

OTHER PUBLICATIONS

Won-ik Kim, Scanning femtocell for macro-to-femto HO in IEEE 802.16m, Oct. 31, 2008, IEEE 802.16 Broadband Wireless Access Working Group, pp. 1-4.*

(Continued)

*Primary Examiner* — Charles Appiah
*Assistant Examiner* — Randy Peaches

(57) ABSTRACT

In order to manage a neighbor list of neighboring base stations based on the location of a terminal communicating with a base station of a macrocell with femtocell deployments, the base station divides the macrocell in accordance with a predetermined standard of division, and generates a mobile neighbor advertisement message so as to periodically transmit the generated message to the terminal. At this time, the terminal identifies the current location thereof in the macrocell upon receipt of the pilot signals periodically transmitted from the base station of the macrocell. The terminal obtains information regarding the location of the terminal from the information regarding the femtocells deployed within the respective divided regions and information regarding macrocells neighboring the macrocell through using the mobile neighbor advertisement message to scan base stations.

20 Claims, 8 Drawing Sheets

(51) Int. Cl.
  *H04W 84/04* (2009.01)
  *H04W 64/00* (2009.01)
  *H04W 48/16* (2009.01)
  *H04W 48/20* (2009.01)
  *H04W 36/04* (2009.01)
  *H04W 16/30* (2009.01)

(52) U.S. Cl.
  CPC ....... (2013.01); *H04W 48/16* (2013.01); *H04W 48/20* (2013.01); *H04W 36/04* (2013.01); *H04W 16/30* (2013.01)
  USPC .................. 455/456.1; 455/456.3; 455/456.2; 455/458; 455/457

(56) References Cited

FOREIGN PATENT DOCUMENTS

| | | |
|---|---|---|
| JP | 2000287250 A | 10/2000 |
| JP | 2002204470 A | 7/2002 |
| KR | 10-2007-0055713 | 5/2007 |
| WO | WO 2004/047475 A1 | 6/2004 |
| WO | WO 2007/103062 A1 | 9/2007 |

OTHER PUBLICATIONS

Notice of Allowance from Korean Intellectual Property Office dated Oct. 23, 2012 in connection with Korean Application No. 10-2009-0079442, 7 pages.

International Search Report and Written Opinion of International Searching Authority dated Jun. 16, 2011 in connection with PCT Application No. PCT/KR2009/006916.

Won-Ik Kim, et al.: "Location-Based Network Discovery for 802.16m", IEEE 802.16 Presentation Submission Template (Rev. 9); Sep. 5, 2008, pp. 1-8.

Won-Ik Kim, et al.: "Scanning Femtocells for Macro-to-Femto HO in IEEE 802.16m", IEEE 802.16 Broadband Wireless Access Working Group; Oct. 31, 2008; pp. 1-4.

Ju Yeop Kim, et al.: An Efficient Scanning Scheme for Neighbor Indoor BSs in Case of Indoor and Outdoor Cells Coexisting in OFDMA Cellular Systems, JCCI2008, 2008, pp. 1-5.

\* cited by examiner

METHOD FOR MANAGING NEIGHBOR BASE STATION LIST BASED ON TERMINAL LOCATION FOR EFFICIENT CELL SELECTION AND HANDOFF IN MACROCELL ENVIRONMENTS WITH FEMTOCELL

CROSS-REFERENCE TO RELATED APPLICATION(S)

The present application claims priority under 35 U.S.C. §365 to International Patent Application No. PCT/KR2009/006916 filed Nov. 24, 2009, entitled "METHOD FOR MANAGING NEIGHBOR BASE STATION LIST BASED ON TERMINAL LOCATION FOR EFFICIENT CELL SELECTION AND HANDOFF IN MACROCELL ENVIRONMENTS WITH FEMTOCELL". International Patent Application No. PCT/KR2009/006916 claims priority under 35 U.S.C. §365 and/or 35 U.S.C. §119(a) to Korean Patent Application No. 10-2008-0123304 filed Dec. 5, 2008 and Korean Patent Application No. 10-2009-0079442 filed Aug. 26, 2009, and which are incorporated herein by reference into the present disclosure as if fully set forth herein.

TECHNICAL FIELD

The present invention relates to a terminal-location-based neighbor base station list management method for efficient cell selection and handoff in macrocell environments with femtocell deployments, and more particularly, to a method for managing a neighbor base station list based on a location of a terminal so that it is capable of efficiently conducting the cell selection and the handoff by considering the location of a terminal under the macrocell environments deployed with a plurality of femtocells.

BACKGROUND ART

Various convergence services have been made and developed due to the multiplied burden of communication expenses and the development of wired and wireless communication technologies pursuant to deepened competition of communication markets, deterioration in profitability, and diversified consumer requirements.

In particular, the trend of communication markets being a fixed mobile convergence (FMC) becomes a new paradigm where existent subscribers are prevented from seceding and new services are made. The femtocell technology is representative of the FMC. The femtocell refers to a very small scale cell, and a femto base station is installed indoors, mainly at the inside of a common house.

The femtocell has a coverage with a radius of 10 m or less. The femtocell widens the indoor coverage and enhances the communication quality so as to efficiently provide various fixed mobile convergence services. Furthermore, the femtocells are much differentiated in capacity and performance depending upon the wireless access technologies used, which mainly include wireless broadband internet (WiBro), wideband code division multiple access (WCDMA), a global system for mobile communications (GSM), and a system of 3G long term evolution (LTE).

Assuming that a plurality of femtocells (ranging from several tens to several hundreds) are deployed within a macrocell while just applying a handoff method of the existent wireless access technology to the macrocell environment with the femtocell deployments, the femtocells increase in number, and accordingly, the neighbor cells also increase in number so that the power consumption required for the relevant terminal to scan all the base stations is increased. Further, the data transmission and reception are delayed due to the increased scanning time. In addition, the message that the base station in the macrocell broadcasts for communicating with the terminal is large so that the overhead becomes excessively enlarged.

For these reasons, it is required to manage a neighbor list of neighboring base stations based on the location of a terminal such that the cell selection and the handoff should be efficiently conducted under the environments deployed with femtocells.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for managing a neighbor base station list based on a location of a terminal location so as to make cell selection and handoff under the macrocell environments with femtocell deployments efficient.

Solution to Problem

An exemplary embodiment of the present invention provides a method for managing a list of neighbor base stations based on the location of a terminal that transmits/receives data to/from a base station of a macrocell with femtocell deployments. The method includes, dividing the macrocell, by the base station, in accordance with a predetermined standard of division; and generating, by the base station, a mobile neighbor advertisement message and periodically transmitting the generated message to the terminal, the mobile neighbor advertisement message containing information regarding macrocells neighboring the macrocell and information regarding the femtocells deployed within the respective divided areas of the macrocell, wherein the terminal identifies the current location thereof in the macrocell upon receipt of pilot signals periodically transmitted from the base station of the macrocell, and obtains information regarding the location of the terminal from the information regarding the femtocells deployed within the respective divided areas and information regarding the neighbor macrocells by using the mobile neighbor advertisement message to perform a scanning.

Another exemplary embodiment of the present invention provides a method of managing a list of neighboring base stations based on the location of a terminal in a macrocell with femtocell deployments. The method includes, wherein the terminal identifies a current location in the macrocell at the terminal upon receipt of the pilot signals periodically transmitted from a base station of the macrocell, demarcating, by the base station, the macrocell into a plurality of concentric circles in accordance with a predetermined standard of demarcation; generating, by the base station, a mobile neighbor advertisement message and transmitting the generated message to the terminal in a cyclic manner, the mobile neighbor advertisement message containing information regarding macrocells neighboring the macrocell and information regarding the femtocells deployed within the respective demarcated concentric circles; sectoring, by the base station, the macrocell with the plurality of demarcated concentric circles into a plurality of sectors to establish reuse areas such that the reuse areas do not interfere with each other; and reusing, by the base station, the frequency and preamble used by the femtocells deployed within the outer-sided of the plurality of concentric circles in the reuse areas.

Advantageous Effects of Invention

With the exemplary embodiment of the present invention, when femtocells are deployed within a macrocell, a handoff is conducted efficiently so as to make the femtocells be used commonly. Furthermore, as the communication is realized only with small transception power, the dead ground of electronic waves is removed.

In addition, with the exemplary embodiment of the present invention, as the neighbor base stations are managed on the basis of the location of a terminal, the range and time of scanning of the terminal are reduced. Accordingly, the power consumption of the terminal decreases, and the data transception cut-off region is reduced, thereby increasing the data processing rate.

MODE FOR THE INVENTION

Figure 1:
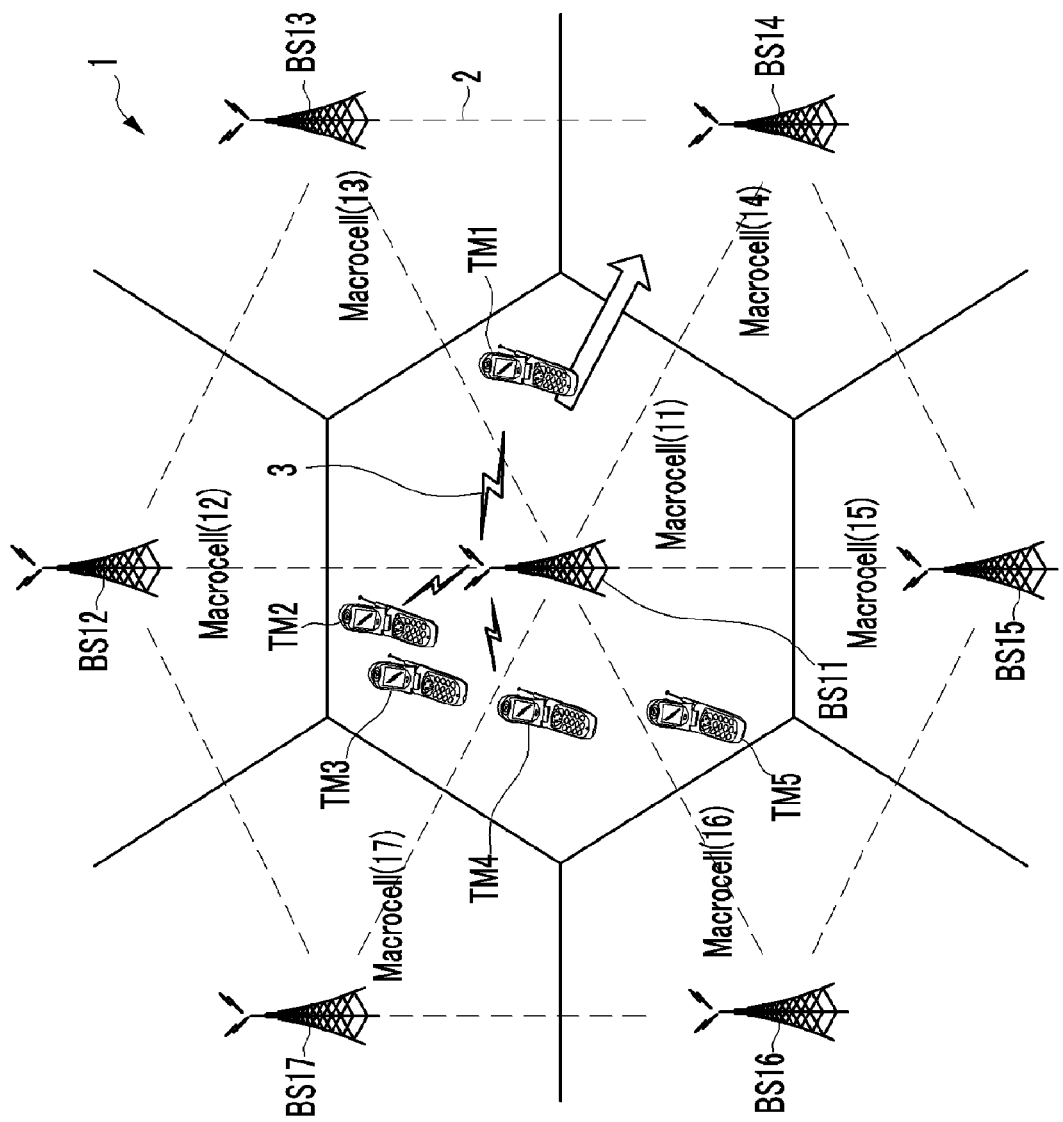
FIG. 1 is a schematic view of a macrocell system according to a prior art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Figure 2:
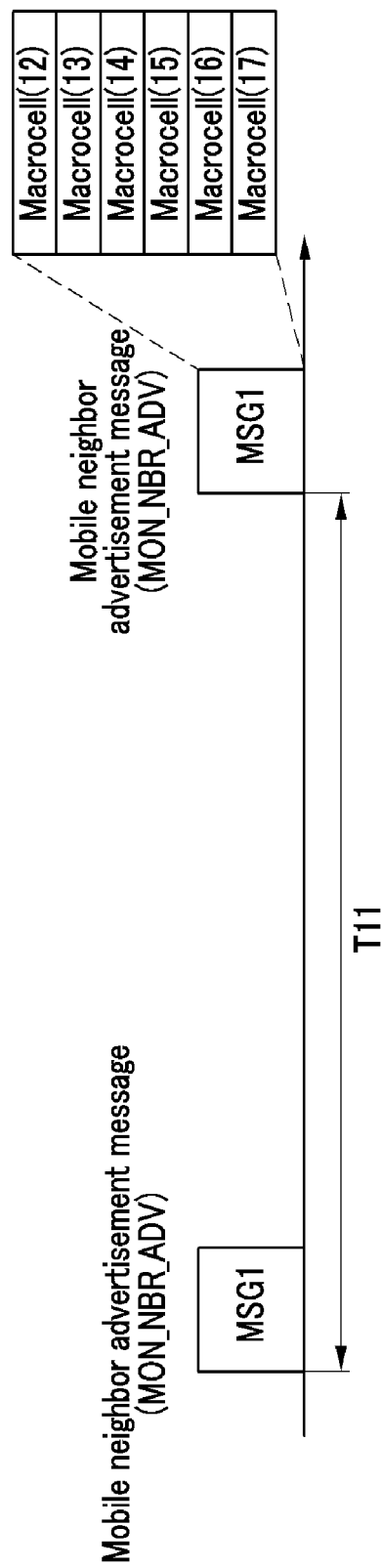
FIG. 2 illustrates a message broadcasted from a conventional macrocell system to neighbor base stations.
Figure 3:
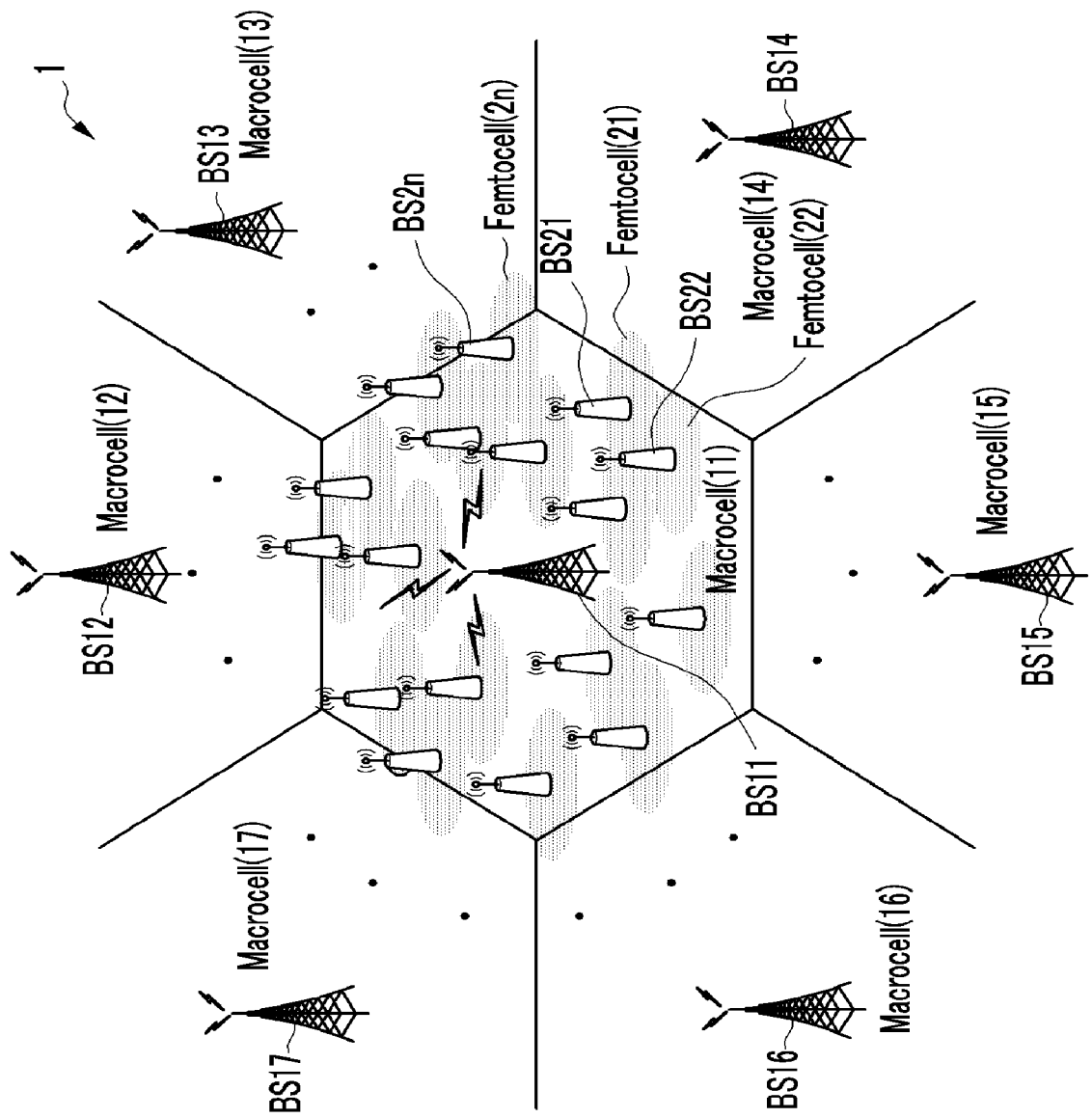
FIG. 3 is a schematic view of a conventional macrocell system with femtocell deployments.
Figure 4:
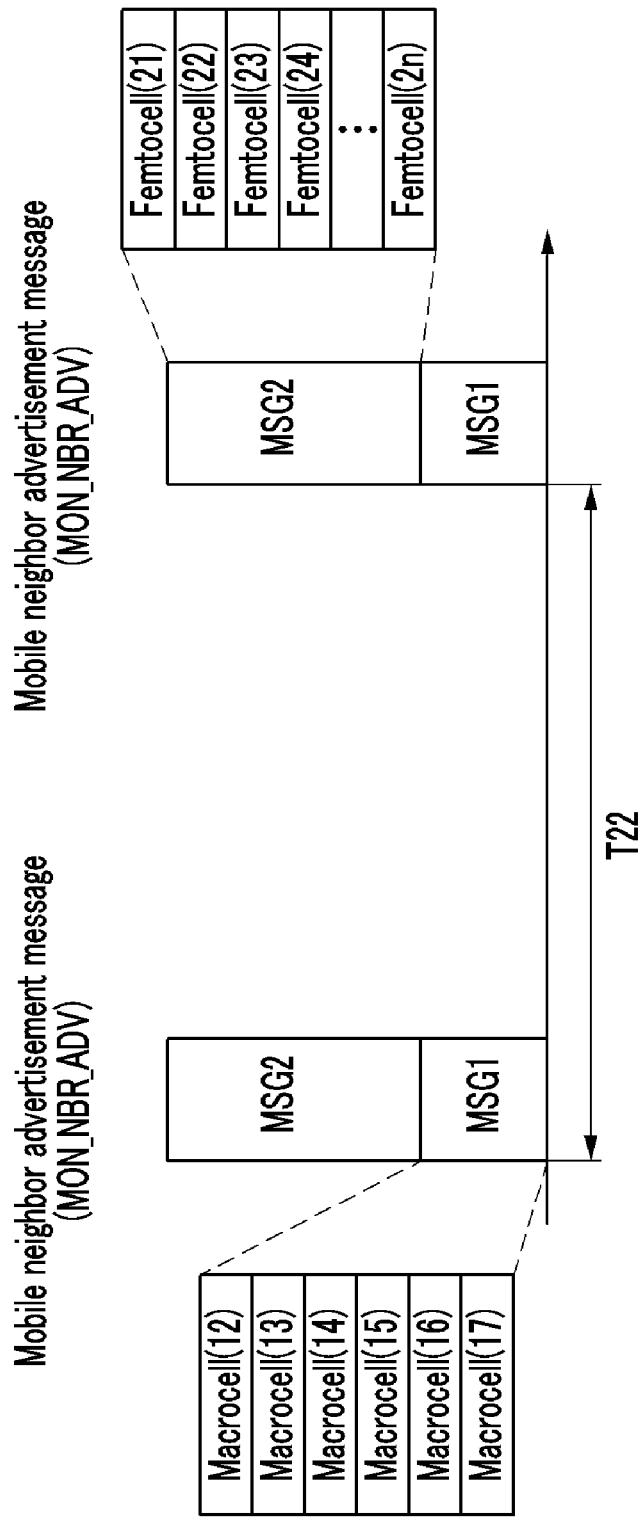
FIG. 4 schematically illustrates a message broadcasted to neighbor base stations with the femtocell deployments shown in FIG. 3.

FIG. 1 is a schematic view of a conventional macrocell system, and FIG. 2 illustrates a message broadcasted from the conventional macrocell system to neighbor base stations. FIG. 3 schematically illustrates the conventional macrosystem deployed with femtocells, and FIG. 4 schematically illustrates a message broadcasted to neighbor base stations with the femtocell deployments shown in FIG. 3.

As shown in FIG. 1, the conventional macrocell system 1 has base stations BS11 to BS17, and collects information regarding the core base station BS11 and the neighbor base stations BS12 to BS17 through a backbone network 2. The macrocell system 1 broadcasts the collected information to all the terminals TM1 to TM5 belonging to the region of the macrocell 11 where the core base station BS11 is located, by way of a neighbor base station advertisement 3. Included in the information that the base station BS11 collects and broadcasts are a frequency used by the neighbor base stations BS12 to BS17, a preamble allocated to the respective base stations, and a base station identifier (BSID) of the respective base stations. The preamble includes all the preamble-patterned information used by the respective base stations, and the terminals TM1 to TM5 search the base stations BS11 to BS17 to communicate therewith by using the preamble.

The process where the terminals TM1 to TM5 search all the frequencies available to the neighbor base stations BS12 to BS17 and find the relevant base stations to communicate therewith is called scanning. Scanning is a process required when the terminals TM1 to TM5 are first connected to the macrocell system 1, and when the terminals TM1 to TM5 move through the macrocells 11 to 17 so as to begin communicating with a new base station. Furthermore, scanning is a process also required when the terminals TM1 to TM5 search the neighbor base stations BS12 to BS17 so as to select the most appropriate base station during the conduction of a handoff.

If the first terminal TM1 of the terminals TM1 to TM5 belonging to the region of the base station BS11 does not have any information regarding the neighbor base stations BS12 to BS17 during the handoff scanning, the terminal TM1 should search all the preamble patterns for the neighbor base stations BS12 to BS17 so that much time is consumed in the handoff scanning. In order to prevent the scanning from being performed non-efficiently, the base station BS11 periodically broadcasts a mobile neighbor advertisement message (MOB_NBR_ADV) MSG1 containing information regarding the neighbor base stations BS12 to BS17 to the terminal TM1. The mobile neighbor advertisement message MSG1 is transmitted to the terminal TM1 by a predetermined transmission cycle T11. Then, the terminal TM1 identifies information regarding the neighbor base stations BS12 to BS17 through the mobile neighbor advertisement message MSG1, and scans only the base stations BS12 to BS17 neighboring thereto, thereby reducing the time required for the scanning.

Particularly when the terminal TM1 travelling between the macrocells 11 and 14 selects the base station BS14 neighboring thereto to conduct a handoff, the terminal TM1 scans only the base station BS13 neighboring thereto, thereby performing the handoff efficiently. However, as shown in FIG. 3 and FIG. 4, when a plurality of femtocells 21 to 2n and a plurality of base stations BS21 to BS2n are installed within the macrocell 11, the information transmitted to the terminal TM1 increases because it should contain a mobile neighbor advertisement message MSG2 containing information regarding base stations BS21 to BS2n of the plurality of femtocells 21 to 2n, as well as the mobile neighbor advertisement message MSG1 containing information regarding the neighbor base station BS14. That is, the number of neighbor base stations to be scanned in order to cope with the prior synchronization in preparation for the handoff increases, and the mobile neighbor advertisement message MSG1 to be advertised by the base station BS11 is enlarged.

In this way, when the handoff way of the conventional wireless access technology is applied to the environment of the macrocell 11 deployed with the femtocells 21 to 2n, the number of neighbor cells increases as the number of femtocells 21 to 2n increases. Consequently, it becomes problematic that the power consumed for the terminal TM1 to scan all the base stations BS21 to BS2n increases, and the data transmission and reception are delayed due to the increased scanning time. Furthermore, the mobile neighbor advertisement message MSG1 advertised by the base station BS11 of the macrocell 11 communicating with the terminal TM1 increases in dimension so that the MAC overhead becomes very large.

In order to solve such a problem, a macrocell system according to an exemplary embodiment of the present invention, in which a neighbor list of neighboring base stations is managed on the basis of the location of a terminal so as to conduct the cell selection and the handoff efficiently, will be specifically described with reference to FIG. 5 to FIG. 8.

Figure 5:
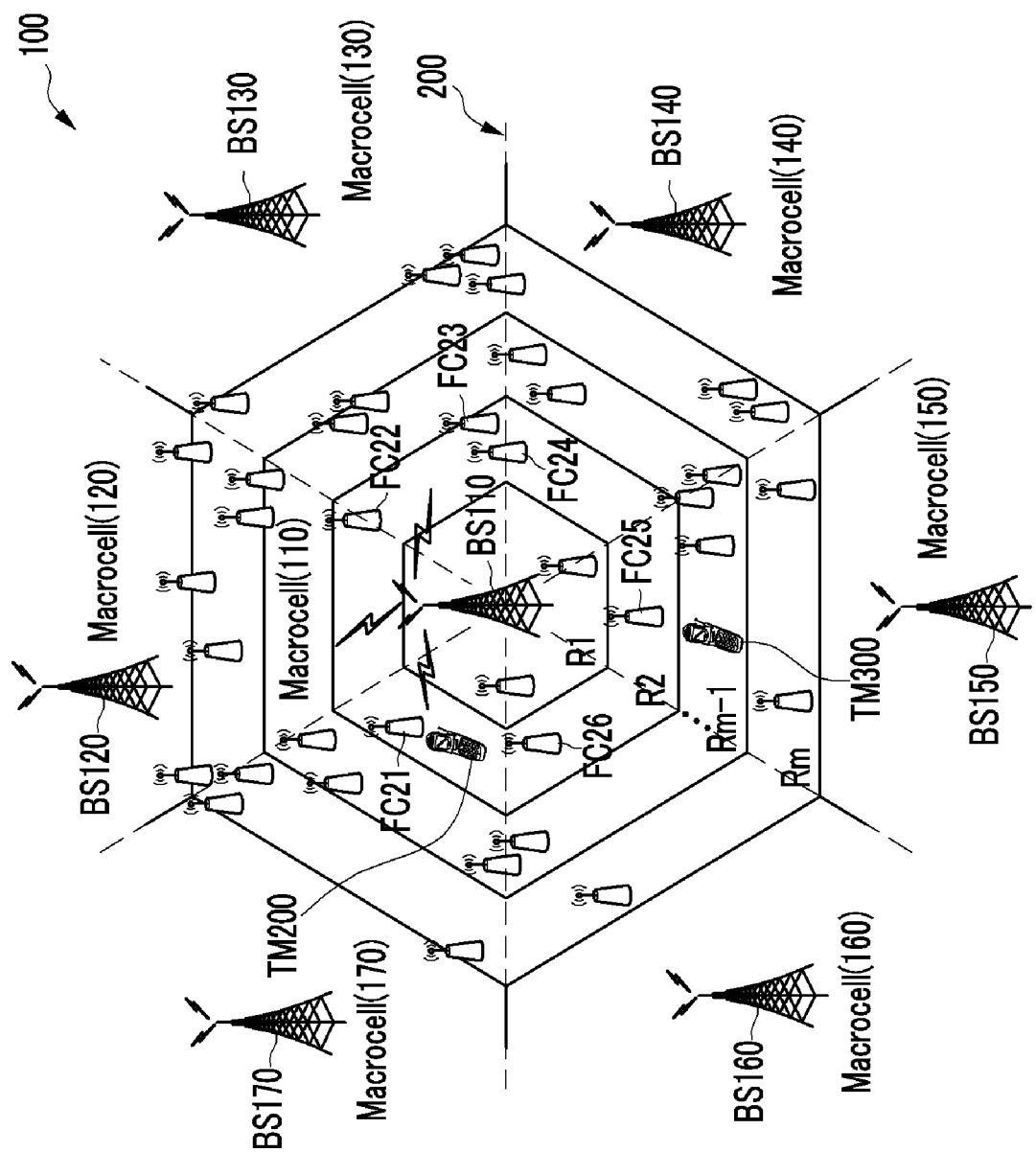
FIG. 5 is a schematic view of a macrocell system with a plurality of concentric circles according to an exemplary embodiment of the present invention.
Figure 6:
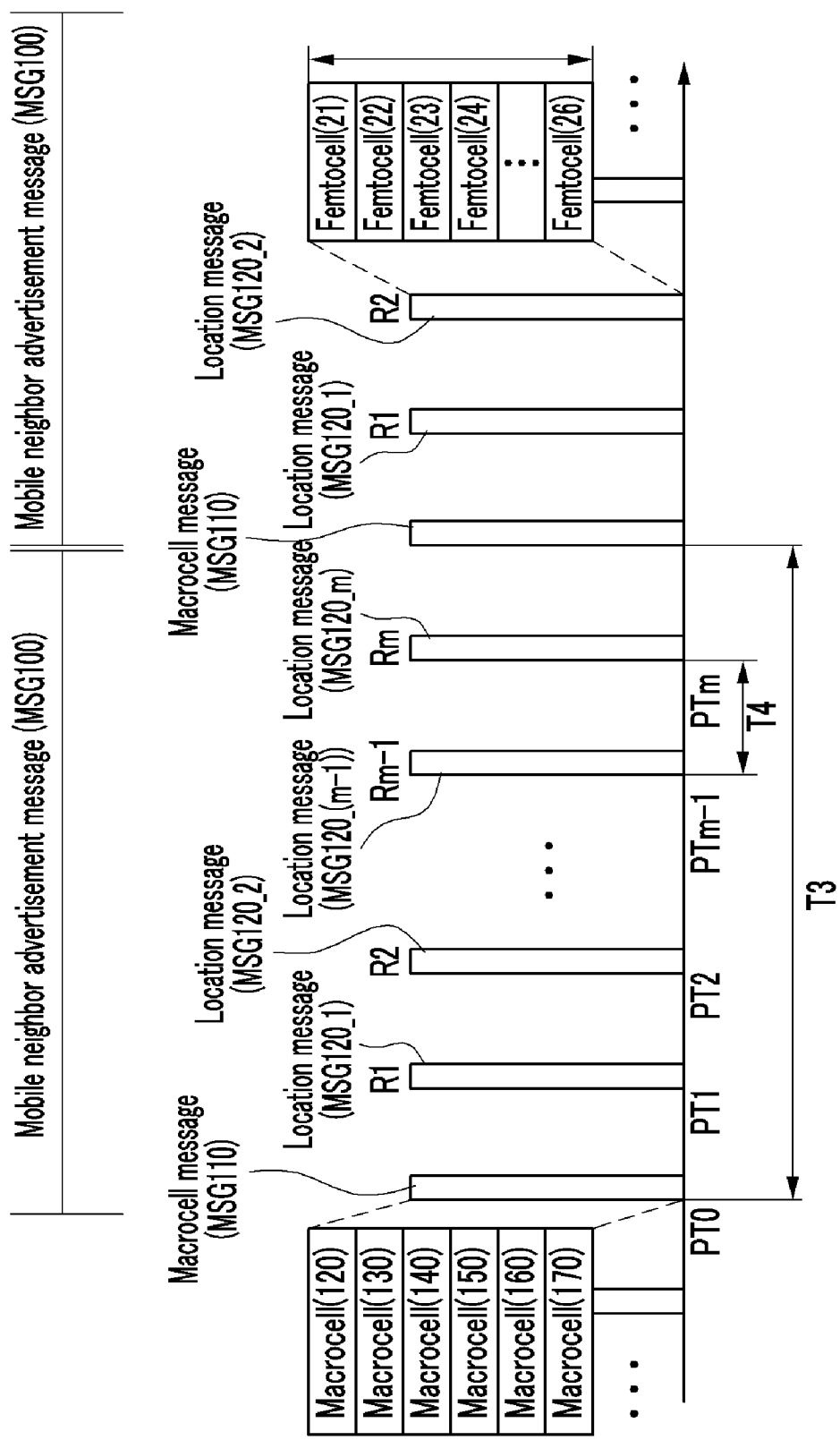
FIG. 6 schematically illustrates a message advertised from the macrocell system shown in FIG. 5 to neighbor base stations.
Figure 7:
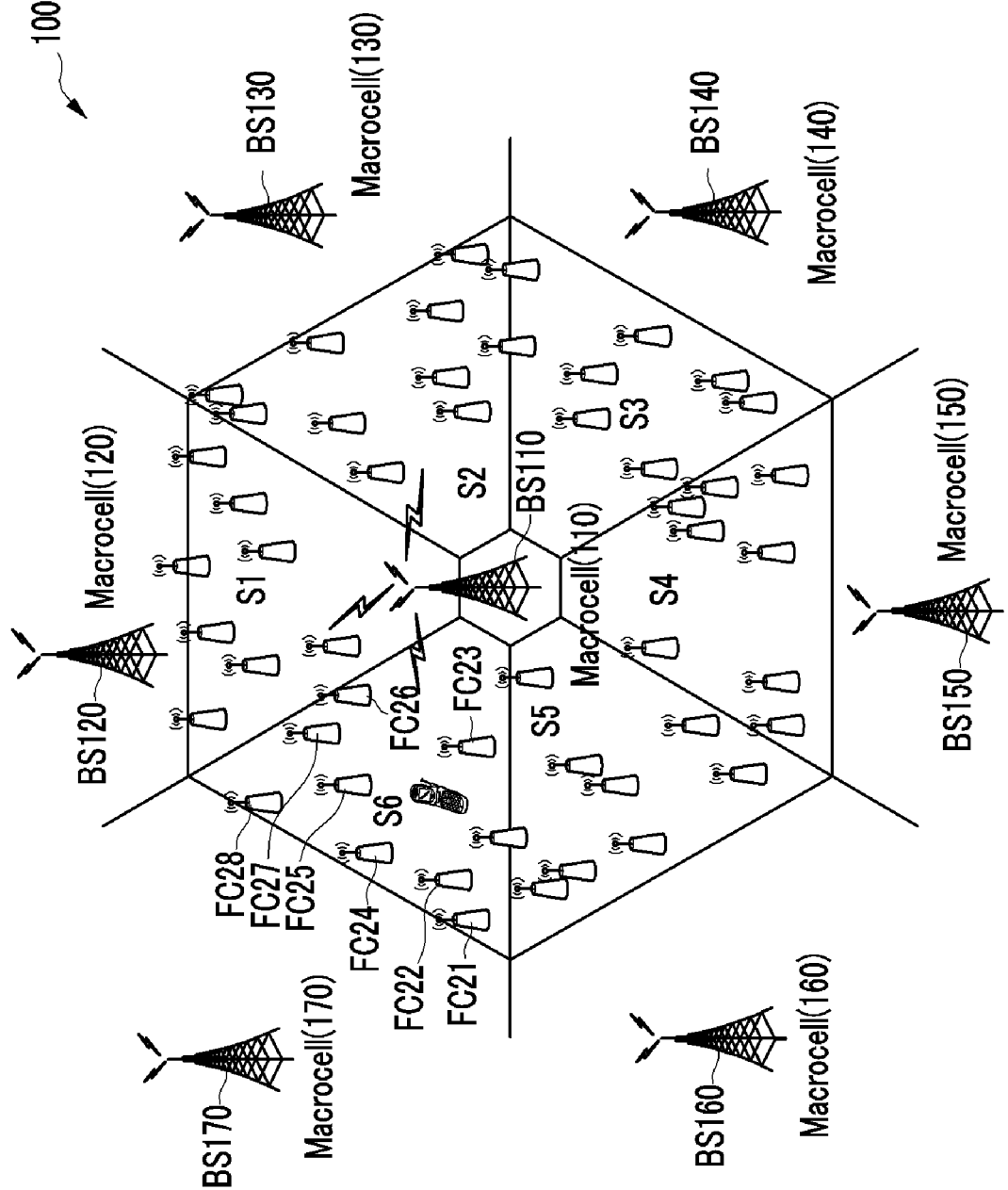
FIG. 7 is a schematic view of a macrocell system with a plurality of sectors according to an exemplary embodiment of the present invention.
Figure 8:
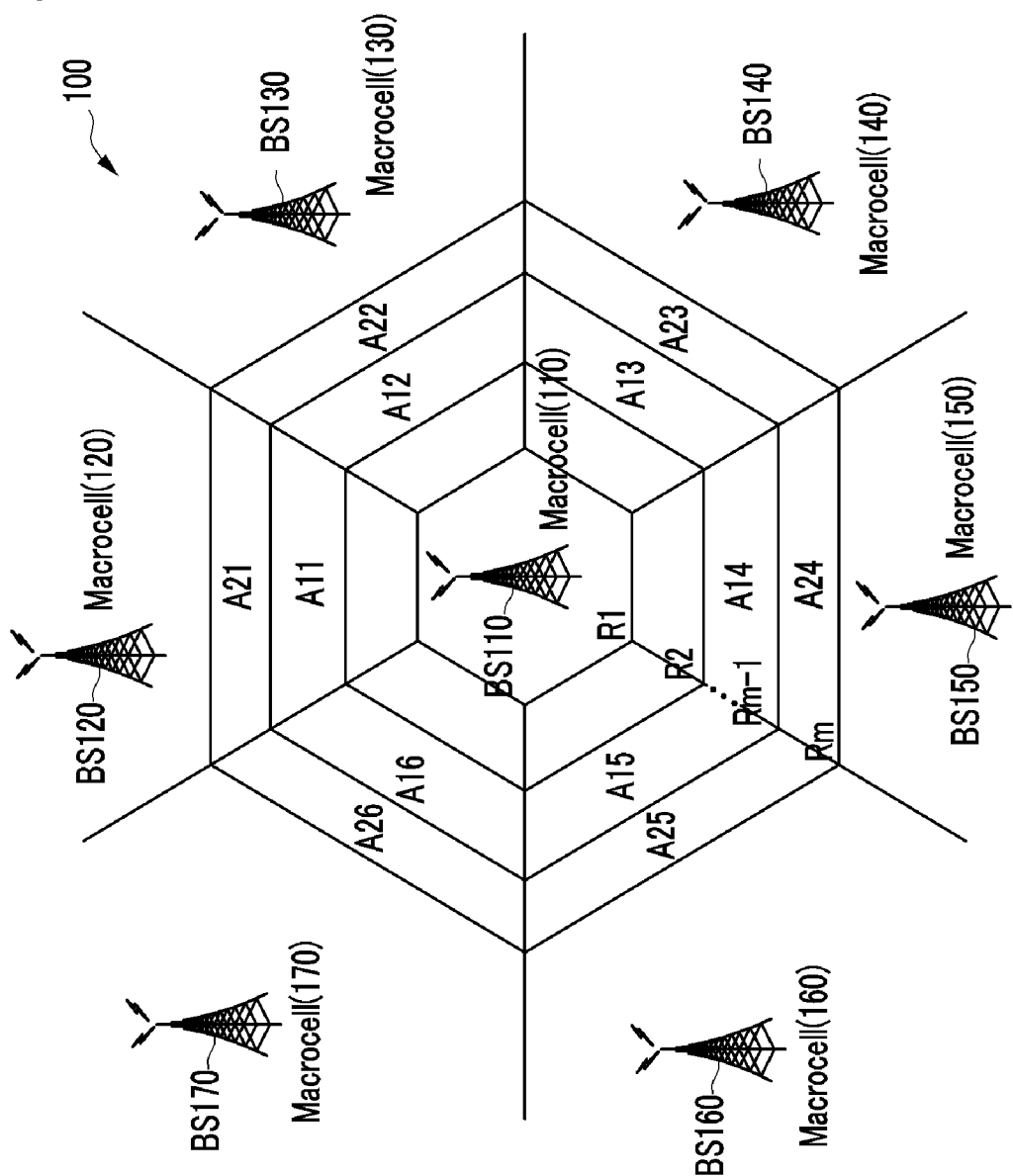
FIG. 8 illustrates the reuse of a preamble and a frequency with a macrocell system according to an exemplary embodiment of the present invention.

FIG. 5 schematically illustrates a macrocell system with a plurality of concentric circles, and FIG. 6 schematically illustrates a message advertised from the macrocell system shown in FIG. 5 to neighbor base stations. FIG. 7 schematically illustrates a macrocell system with a plurality of sectors according to an exemplary embodiment of the present invention, and FIG. 8 illustrates the reuse of a preamble and a frequency with a macrocell system according to an exemplary embodiment of the present invention.

It is assumed according to an exemplary embodiment of the present invention that the core base station BS110 classifies and stores the information received from the neighbor base stations BS120 to BS170 and the information received from the base stations of the plurality of femtocells FC21 to FC2p, and identifies the locations of the neighbor base stations BS120 to BS170 and the plurality of femtocells FC21 to FC2p. It is illustrated in FIG. 5 that among the plurality of femtocells FC21 to FC2p deployed within the macrocell 110, reference numerals are assigned only to the femtocells FC21 to FC26 located within the second concentric circle R2.

As shown in FIG. 5, the base station BS110 of the macrocell system 100 according to an exemplary embodiment of the present invention demarcates the concentric circles R1 to Rm by applying a predetermined standard of demarcation (e. g., the intensity of electronic waves) so as to make the cell tiered, and constructs a mobile neighbor advertisement message MSG 100 to be advertised while bundling only the information regarding the femtocells located within the respective demarcated concentric circles R1 to Rm among the plurality of femtocells FC21 to FC2p. The base station BS110 transmits the mobile neighbor advertisement message MSG100 to the terminal TM200 in a cyclic manner.

The mobile neighbor advertisement message MSG100 according to an exemplary embodiment of the present invention includes a macrocell message MSG110 containing information regarding the neighbor base stations BS120 to BS170 and transmitted by a predetermined cycle T3, and location messages MSG120_1 to MSG120_m containing information regarding the locations of the femtocells deployed at the respective concentric circles R1 to Rm within the macrocell 110 and transmitted by a predetermined cycle T4. FIG. 6 illustrates such an advertisement message. Irrespective of the location of the terminal TM200, the macrocell message MSG110 is transmitted to all the remaining terminals TM300 existing within the macrocell 110. That is, the terminal TM200 obtains the macrocell message MSG110 and the location message MSG120_2 of the concentric circle R2 to which it belongs, while it periodically receives the mobile neighbor advertisement message MSG100.

Specifically, the terminal TM200 measures the intensity of the pilot signals periodically transmitted thereto from the base station BS110, and detects the distance thereof to the base station BS110 so as to identify to which concentric cycle R2 within the macrocell 110 it belongs. The terminal TM200 obtains the location message MSG120_2 containing information regarding the femtocells FB21 to FB26 located within the concentric circle R2 to which it belongs from the mobile neighbor advertisement message MSG100 transmitted by the base station BS110. The terminal TM200 scans only the femtocells FB21 to FB26 identified from the obtained location message MSG120_2 so as to reduce the time and the power consumed during the scanning period.

A method of obtaining a mobile neighbor advertisement message MSG 100 at the terminal TM200 belonging to the second concentric circle R2 among the concentric circles R1 to Rm within the macrocell 110 will now be described in detail.

As shown in FIG. 5 and FIG. 6, when the terminal TM200 accesses the base station BS110 of the macrocell 110 according to an exemplary embodiment of the present invention, the base station BS110 provides information regarding the time when the macrocell message MSG110 is broadcasted, and information regarding the cell access. Then, the terminal TM200 obtains a macrocell message MSG110 depending upon the information from the base station BS110. That is, the terminal TM200 receives information regarding the cell access, the point of time PT0 of arrival of the macrocell message MSG110, and the transmission cycle of the macrocell message MSG110, and obtains the macrocell message MSG110 depending upon the point of time PT0 of arrival of the macrocell message MSG110.

The terminal TM200 judges to which one of the concentric circles R1 to Rm it belongs through the intensity of the pilot signals, and obtains the location message MSG120_2 for the second concentric circle R2 to which it belongs at a predetermined point of time per the respective concentric circles, from the broadcasted location messages MSG120_1 to MSG120_m. Specifically, as the broadcasting point of time of the macrocell message MSG110 is PT0, the transmission cycle of the location messages MSG120_1 to MSG120_m is T4, and the entire indices of the concentric circles R1 to Rm are $T_{R1}=1$ to $T_{Rm}=m$, the terminal TM200 belonging to the second concentric circle R2 can identify the point of time PT2=PT0+(T4×$T_{R2}$) of obtaining the broadcasted location message MSG120_2. Here, the index of the concentric circle R2 is $T_{R1}=2$, and the transmission cycle T4 of the location messages MSG120_1 to MSG120_m is produced by dividing the transmission cycle T3 of the macrocell message MSG110 by the number of concentric circles R1 to Rm.

The terminal TM200 stores the information required for computing the point of time of receiving the location message MSG120_2 in first communicating with the base station BS110 of the macrocell 110, and obtains the mobile neighbor advertisement message MSG100 from the base station BS110 by computing the point of time when the required information is broadcasted using the stored information even after it conducts a handoff to one of the femtocells FB21 to FB26 of the concentric circle R2. If the terminal TM200 conducts the handoff not to the concentric circle R2 but to the base station BS120 of the macrocell 120, the terminal TM200 deletes the information obtained through communicating with the base station BS110 of the macrocell 110. The terminal TM200 obtains the information required for producing the point of time of broadcasting the location message from a new base station BS120 in the same way as the way of obtaining the information required for producing the point of time of broadcasting the location message MSG120_2 from the base station BS110 of the macrocell 110 so as to produce the point of time of broadcasting the location message of the present terminal TM200, and obtain the location message agreeing to that time point.

Meanwhile, as shown in FIG. 7, the base station BS110 of the macrocell system 100 according to an exemplary embodiment of the present invention sectors the cell thereabout into sectors S1 to Sq by a predetermined angle, and bundles only the information regarding the femtocells located within the respective sectors S1 to S6 among the plurality of femtocells FC21 to FC2p so as to construct a mobile neighbor advertisement message MSG100 to be advertised thereby. The base station BS110 transmits the mobile neighbor advertisement message MSG100 to the terminal TM200 in a cyclic manner. It is assumed and illustrated in FIG. 7 that the macrocell 110 is sectored into six sectors S1 to S6, and the terminal TM200 is located at the sixth sector S6, while eight femtocells FC21 to FC28 are located within the sector S6. Reference numerals are assigned only to the femtocells FC21 to FC28 located within the sixth sector S6 among the plurality of femtocells FC21 to FC2p deployed within the macrocell 110.

Referring to FIG. 6 and FIG. 7, the terminal TM200 measures the intensity of the pilot signals from the core base station BS110 and the neighbor base stations BS120 to BS170 in the same way as the way of identifying the location thereof by demarcating the macrocell 110 into concentric circles R1 to Rm so as to detect the distance thereof to the base station BS110 and identify to which sector S6 within the macrocell 110 it belongs. The terminal TM200 obtains the location-based message MSG120_6 containing information regarding the femtocells located within the sixth sector S6 among the location messages MSG120_1 to MSG120_6 broadcasted corresponding to the sectors S1 to S6.

If the macrocell 110 is sectored into sectors S1 to Sq, the sectoring of the macrocell 110 is made such that each sector has the same area. Therefore, the problem that the information regarding the femtocells contained in the location messages MSG120_1 to MSG120_m per the respective sectors S1 to Sq increases due to the increase in the number of femtocells per the sectored areas does not occur. However, as shown in FIG. 5, if the macrocell 110 is demarcated into a plurality of concentric circles R1 to Rm so as to make the cell tiered, the radius of the cell is enlarged when it comes to the outer boundary of the macrocell 110 from the center thereof so that the area of the concentric cells R1 to Rm is widened, and accordingly the number of femtocells deployed within the concentric circles R1 to Rm increases, and the information regarding the femtocells contained in the location messages MSG120_1 to MSG120_m per the respective concentric circles R1 to Rm increases. Therefore, in order to prevent the problematic increase in the information about the femtocells as it comes from the center of the macrocell 110 to the outer boundary thereof if the macrocell 110 is demarcated into the concentric circles R1 to Rm, it is needed to reuse the frequency and preamble used by the plurality of femtocells FC21 to FC2p deployed in the macrocell 110 per the demarcated regions.

In order to solve such a problem, as shown in FIG. 8, the macrocell 110 demarcated into the concentric circles R1 to Rm according to an exemplary embodiment of the present invention is sectored into sectors S1 to Sq, and the frequency and preamble thereof are reused per the reuse areas A11 to A26 to the extent that no interference occurs therebetween. It is described with an exemplary embodiment of the present invention that the macrocell 110 is demarcated into the concentric circles R1 to Rm and then sectored into the sectors S1 to Sq, but the present invention is not limited thereto. That is, it is possible to sector the macrocell 110 into the sectors S1 to Sq and then to demarcate it into the concentric circles R1 to Rm, thereby establishing the reuse areas A11 to A26.

Specifically, the concentric circles R1 and R2 placed at the macrocell 110 close to the base station BS110 use the same frequency and preamble. However, as it comes to the outermost concentric circle Rm of the macrocell 110 through the immediately previous circle Rm-1 thereof, the area is widened so that the information regarding the femtocells increases. Therefore, the base station BS110 sectors the concentric circles Rm-1 and Rm, and establishes the reuse areas A11 to A26 to the extent that no interference occurs therebetween. For example, the base station BS110 sectors the concentric circle Rm-1 into six reuse areas A11 to A16, and the same frequency and preamble are used in the reuse areas A11 and A14, A12 and A15, and A13 and A16, in which no interference occurs therebetween, respectively. In the same way, the base station BS110 demarcates the concentric circle Rm into six reuse areas A21 to A26, and the same frequency and preamble are used in the reuse areas A21 and A24, A22 and A25, and A23 and A26, in which no interference occurs therebetween, respectively. Then, even if the index of the concentric circles R1 to Rm of the macrocell 110 increases, the reuse rate of the frequency and preamble increases together. Therefore, the information regarding the femtocells contained in the location messages MSG120_1 to MSG120_m can be reduced.

If the frequency and the preamble are reused as above, the macrocell message MSG110 of the mobile neighbor advertisement message MSG100 shown in FIG. 6 contains the index of the frequency and preamble used by the neighbor base stations BS120 to BS170, and the identifier of the base station BS110. Furthermore, the location messages MSG120_1 to MSG120_m contain the index of the concentric circles R1 to Rm, the index of the sectors S1 to S6, or the index information regarding the frequency and preamble reused by the femtocells deployed in the concentric circles or sectors.

As the transmission cycle T4 of the location messages MSG120_1 to MSG120_m is established to be shorter than the transmission cycle T11 of the mobile neighbor advertisement message MSG1 shown in FIG. 2, the time and power required for identifying the location of the terminal TM200 is reduced while no variation occurs in the amount of total broadcasting messages advertised by the base station BS110, although a load occurs in the downlink due to the repeated broadcasting of a large amount of messages.

In this way, with a macrocell system 100 according to an exemplary embodiment of the present invention, the macrocell 110 around the base station BS110 is demarcated into concentric circles R1 to Rm or sectored into sectors S1 to Sq so as to manage neighbor base stations BS120 to BS170 and a plurality of femtocells FC21 to FC2p. Therefore, the terminal TM200 scans only the cells that are capable of conducting a handoff thereto at the current location thereof so that the cell selection and the handoff conduction can occurs in an efficient manner. That is, the terminal TM200 detects the target distance from the intensity of the pilot signals received from the base station BS110 of the macrocell 110, and the target direction from the intensity of the pilot signals received from the neighbor base stations BS120 to BS170 so as to identify the current location thereof. Based on the identification, the terminal TM200 conducts the scanning only when the information of the base stations currently neighboring thereto is advertised, thereby reducing the range and time to be scanned during the cell selection and the handoff, and conducting the cell selection and the handoff in a more efficient manner. Accordingly, the power consumption of the terminal is reduced, and the data transception cut-off area is reduced, thereby increasing the data processing rate.

The above-described exemplary embodiments of the present invention are realized not only through a device or method, but also through a program or program-recorded medium with functions corresponding to the structures thereof, and such a realization may be easily made from the described, by any person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for managing a list of neighboring base stations based on a location of a terminal that transmits/receives data to/from a base station of a macrocell with femtocell deployments, the method comprising:
   dividing the macrocell, by the base station, in accordance with a predetermined standard of division; and
   generating, by the base station, a mobile neighbor advertisement message and periodically transmitting the generated message to the terminal, the mobile neighbor advertisement message containing information regarding macrocells neighboring the macrocell and information regarding the femto cells deployed within the respective divided areas of the macrocell,
   wherein the terminal identifies a current location thereof in the macrocell upon receipt of pilot signals periodically transmitted from the base station of the macrocell, and obtains information regarding the location of the terminal from the information regarding the femtocells deployed within the respective divided areas and information regarding the neighbor macro cells by using the mobile neighbor advertisement message to perform a scanning.

2. The method of claim 1, wherein the dividing of the macrocell comprises one of: demarcating the macrocell into a plurality of concentric circles by applying the predetermined division standard thereto, and sectoring the macrocell into a plurality of sectors by applying the predetermined division standard thereto.

3. The method of claim 2, further comprising:
   when the macrocell is demarcated into a plurality of concentric circles, sectoring, by the base station, the macrocell with the demarcated concentric circles into the plurality of sectors to establish reuse areas such that the reuse areas do not interfere with each other; and
   reusing, by the base station, the frequency and preamble used by the femtocells deployed within the outer side of the plurality of concentric circles in the reuse areas.

4. The method of claim 2, wherein the transmitting of the generated message comprises:
   generating a macro cell message containing information regarding the neighbor macro cells to transmit the generated message to the terminal by a first cycle; and
   generating a plurality of location messages containing information regarding the femtocells deployed in the plurality of concentric circles or the plurality of sectors to transmit the generated messages to the terminal by a second cycle that is shorter than the first cycle.

5. The method of claim 4, wherein the second cycle is calculated by dividing the first cycle by the number of the plurality of concentric circles or the plurality of sectors.

6. The method of claim 1, wherein the plurality of location messages are broadcasted at different points of time per the plurality of concentric circles or the plurality of sectors.

7. A method of managing a neighbor list of neighboring base stations based on the location of a terminal in a macrocell with femtocell deployments, the method comprising:
   demarcating, by a base station, the macrocell into a plurality of concentric circles in accordance with a predetermined standard of demarcation;
   generating, by the base station, a mobile neighbor advertisement message and transmitting the generated message to the terminal in a cyclic manner, the mobile neighbor advertisement message containing information regarding macrocells neighboring the macrocell and information regarding the femtocells deployed within the respective demarcated concentric circles;
   sectoring, by the base station, the macrocell with the plurality of demarcated concentric circles into a plurality of sectors to establish reuse areas such that the reuse areas do not interfere with each other; and
   reusing, by the base station, the frequency and preamble used by the femtocells deployed within the outermost circle of the plurality of concentric circles in the reuse areas,
   wherein the terminal identifies a current location in the macrocell of the terminal upon receipt of pilot signals periodically transmitted from the base station of the macrocell.

8. The method of claim 7, wherein the transmitting of the generated message comprises:
   generating a macrocell message containing information regarding the neighbor macrocells;
   generating a plurality of location messages containing information regarding the femtocells deployed within the respective concentric circles;
   transmitting the macrocell message; and
   transmitting all of the plurality of location messages at different points of time before the transmission of a next macrocell message.

9. The method of claim 8, wherein the macrocell message includes an index of the frequency and preamble used by base stations of the neighbor macrocells and an identifier of the base station of the macrocell, and the plurality of location messages include an index of the plurality of concentric circles or the plurality of sectors, and an index of the frequency and preamble reused by the femtocells deployed within the respective concentric circles or the respective sectors.

10. The method of claim 7, wherein the plurality of location messages are broadcasted at different points of time per the plurality of concentric circles or the plurality of sectors.

11. A base station of a macrocell with femtocell deployments, the base station operable to manage a list of neighboring base stations based on a location of a terminal that transmits/receives data to/from the base station, the base station configured to:
   divide the macrocell in accordance with a predetermined standard of division; and
   generate a mobile neighbor advertisement message and periodically transmit the generated message to the terminal, the mobile neighbor advertisement message containing information regarding macrocells neighboring the macrocell and information regarding the femtocells deployed within the respective divided areas of the macrocell, wherein the terminal identifies a current location thereof in the macrocell upon receipt of pilot signals periodically transmitted from the base station, and obtains information regarding the location of the terminal from the information regarding the femtocells deployed within the respective divided areas and information regarding the neighbor macrocells by using the mobile neighbor advertisement message to perform a scanning.

12. The base station of claim 11, wherein the base station is configured to divide the macrocell by one of: demarcating the macrocell into a plurality of concentric circles by applying the predetermined division standard thereto, and sectoring the macrocell into a plurality of sectors by applying the predetermined division standard thereto.

13. The base station of claim 12, the base station further configured to:

when the macrocell is demarcated into a plurality of concentric circles, sector the macrocell with the demarcated concentric circles into the plurality of sectors to establish reuse areas such that the reuse areas do not interfere with each other; and reuse the frequency and preamble used by the femtocells deployed within the outer side of the plurality of concentric circles in the reuse areas.

14. The base station of claim 12, the base station further configured to:

generate a macrocell message containing information regarding the neighbor macrocells to transmit the generated message to the terminal by a first cycle; and generate a plurality of location messages containing information regarding the femtocells deployed in the plurality of concentric circles or the plurality of sectors to transmit the generated messages to the terminal by a second cycle that is shorter than the first cycle.

15. The base station of claim 14, wherein the second cycle is calculated by dividing the first cycle by the number of the plurality of concentric circles or the plurality of sectors.

16. The base station of claim 11, wherein the plurality of location messages are broadcasted at different points of time per the plurality of concentric circles or the plurality of sectors.

17. A base station of a macrocell with femtocell deployments, the base station operable to manage a neighbor list of neighboring base stations based on a location of a terminal in the macro cell, the base station configured to:

demarcate the macrocell into a plurality of concentric circles in accordance with a predetermined standard of demarcation;

generate a mobile neighbor advertisement message and transmit the generated message to the terminal in a cyclic manner, the mobile neighbor advertisement message containing information regarding macrocells neighboring the macrocell and information regarding the femtocells deployed within the respective demarcated concentric circles;

sector the macrocell with the plurality of demarcated concentric circles into a plurality of sectors to establish reuse areas such that the reuse areas do not interfere with each other; and reuse the frequency and preamble used by the femtocells deployed within the outermost circle of the plurality of concentric circles in the reuse areas, wherein the terminal identifies a current location in the macrocell of the terminal upon receipt of pilot signals periodically transmitted from the base station of the macrocell.

18. The base station of claim 17, wherein to transmit the generated message, the base station is further configured to:

generate a macrocell message containing information regarding the neighbor macrocells;

generate a plurality of location messages containing information regarding the femtocells deployed within the respective concentric circles;

transmit the macrocell message; and transmit all of the plurality of location messages at different points of time before the transmission of a next macrocell message.

19. The base station of claim 18, wherein the macrocell message includes an index of the frequency and preamble used by base stations of the neighbor macrocells and an identifier of the base station of the macrocell, and the plurality of location messages include an index of the plurality of concentric circles or the plurality of sectors, and an index of the frequency and preamble reused by the femto cells deployed within the respective concentric circles or the respective sectors.

20. The base station of claim 17, wherein the plurality of location messages are broadcasted at different points of time per the plurality of concentric circles or the plurality of sectors.

* * * * *